US009850419B2

(12) United States Patent
Ballew et al.

(10) Patent No.: US 9,850,419 B2
(45) Date of Patent: Dec. 26, 2017

(54) TRANSPORTATION AND DELIVERY OF SET-DELAYED CEMENT COMPOSITIONS

(71) Applicant: Halliburton Energy Services, Inc., Houston, TX (US)

(72) Inventors: Horton Colby Ballew, Montgomery, TX (US); Ronnie Glen Morgan, Waurika, OK (US); Paul Alan Brown, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/113,156

(22) PCT Filed: Mar. 31, 2014

(86) PCT No.: PCT/US2014/032395
§ 371 (c)(1),
(2) Date: Jul. 21, 2016

(87) PCT Pub. No.: WO2015/152881
PCT Pub. Date: Oct. 8, 2015

(65) Prior Publication Data
US 2017/0009123 A1 Jan. 12, 2017

(51) Int. Cl.
*E21B 33/13* (2006.01)
*C09K 8/467* (2006.01)
(Continued)

(52) U.S. Cl.
CPC .......... *C09K 8/467* (2013.01); *B01F 7/00133* (2013.01); *B01F 7/00158* (2013.01);
(Continued)

(58) Field of Classification Search
CPC ................ C04B 28/18; C04B 40/0658; C04B 2103/22; C09K 8/467; C09K 8/46;
(Continued)

(56) References Cited

U.S. PATENT DOCUMENTS 5,671,581 A 9/1997 Nagahama
6,176,607 B1 1/2001 Hajianpour
(Continued)

FOREIGN PATENT DOCUMENTS

JP 3141114 3/2001
JP 5735928 6/2015
WO 2009-154468 12/2009

OTHER PUBLICATIONS

International Search Report and Written Opinion for International Application No. PCT/US2014/032395 dated Dec. 23, 2014.
(Continued)

*Primary Examiner* — Zakiya W Bates
(74) *Attorney, Agent, or Firm* — John Wustenberg; Tumey L.L.P.

(57) ABSTRACT

Disclosed herein are methods and systems for the transportation and delivery of set-delayed cement compositions to a well site. A method of cementing may comprise preparing a set-delayed cement composition. The method further may comprise storing the set-delayed cement composition. The method further may comprise transporting the set-delayed cement composition to a well site in a containment vessel. The method further may comprise discharging the set-delayed cement composition from the containment vessel and into a wellbore.

18 Claims, 6 Drawing Sheets

(51) Int. Cl.

| | |
|---|---|
| B28C 7/16 | (2006.01) |
| B28C 5/16 | (2006.01) |
| B01F 7/00 | (2006.01) |
| B01F 7/16 | (2006.01) |
| B01F 7/18 | (2006.01) |
| B01F 15/02 | (2006.01) |
| C04B 28/18 | (2006.01) |
| C09K 8/42 | (2006.01) |
| B01F 7/20 | (2006.01) |
| B28C 7/12 | (2006.01) |
| C04B 22/12 | (2006.01) |
| C04B 40/06 | (2006.01) |
| E21B 33/14 | (2006.01) |
| C04B 103/12 | (2006.01) |
| C04B 103/22 | (2006.01) |

(52) U.S. Cl.
CPC ...... *B01F 7/00208* (2013.01); *B01F 7/00633* (2013.01); *B01F 7/1675* (2013.01); *B01F 7/18* (2013.01); *B01F 7/20* (2013.01); *B01F 15/0243* (2013.01); *B01F 15/0283* (2013.01); *B28C 5/16* (2013.01); *B28C 7/126* (2013.01); *B28C 7/161* (2013.01); *B28C 7/163* (2013.01); *C04B 22/124* (2013.01); *C04B 28/18* (2013.01); *C04B 40/0658* (2013.01); *C09K 8/426* (2013.01); *E21B 33/13* (2013.01); *E21B 33/14* (2013.01); *B01F 2015/0221* (2013.01); *B01F 2215/0047* (2013.01); *B01F 2215/0409* (2013.01); *C04B 2103/12* (2013.01); *C04B 2103/22* (2013.01)

(58) Field of Classification Search
CPC ......... C09K 8/426; C09K 8/428; E21B 33/13; E21B 33/14; E21B 33/138
See application file for complete search history.

(56) References Cited

U.S. PATENT DOCUMENTS

| | | | |
|---|---|---|---|
| 7,631,692 B2 | 12/2009 | Roddy et al. | |
| 8,557,036 B1 | 10/2013 | Chatterji et al. | |
| 8,899,329 B2 | 12/2014 | Chatterji et al. | |
| 2007/0235192 A1 | 10/2007 | Michaux et al. | |
| 2009/0038800 A1 | 2/2009 | Ravi et al. | |
| 2011/0118155 A1 | 5/2011 | Pisklak et al. | |
| 2013/0153222 A1 | 6/2013 | Pisklak et al. | |
| 2013/0233550 A1 | 9/2013 | Brothers et al. | |
| 2013/0248183 A1 | 9/2013 | Pisklak et al. | |
| 2013/0269735 A1* | 10/2013 | Roetzel | E21B 21/062 134/40 |
| 2014/0000893 A1 | 1/2014 | Lewis et al. | |
| 2014/0020895 A1 | 1/2014 | Agapiou et al. | |
| 2014/0034313 A1 | 2/2014 | Pisklak et al. | |
| 2014/0034314 A1 | 2/2014 | Lewis et al. | |
| 2014/0048267 A1 | 2/2014 | Pisklak et al. | |
| 2014/0083701 A1 | 3/2014 | Boul et al. | |
| 2014/0090843 A1 | 4/2014 | Boul et al. | |
| 2014/0174741 A1 | 6/2014 | Agapiou et al. | |
| 2014/0190696 A1 | 7/2014 | Iverson et al. | |
| 2014/0202698 A1 | 7/2014 | Pisklak et al. | |
| 2014/0216746 A1 | 8/2014 | Ballew et al. | |
| 2014/0373756 A1 | 12/2014 | Brothers et al. | |
| 2014/0374098 A1 | 12/2014 | Brothers et al. | |
| 2015/0175481 A1 | 6/2015 | Pisklak et al. | |
| 2015/0175869 A1 | 6/2015 | Agapiou et al. | |
| 2015/0197033 A1 | 7/2015 | Agapiou et al. | |
| 2015/0197453 A1 | 7/2015 | Pisklak et al. | |
| 2015/0315875 A1 | 11/2015 | Chatterji et al. | |
| 2015/0322327 A1 | 11/2015 | Chatterji et al. | |
| 2016/0075933 A1 | 3/2016 | Pisklak et al. | |
| 2016/0084037 A1 | 3/2016 | Brothers et al. | |
| 2016/0137902 A1 | 5/2016 | Pisklak et al. | |
| 2016/0186036 A1 | 6/2016 | Pisklak et al. | |
| 2016/0194545 A1 | 7/2016 | Pisklak et al. | |

OTHER PUBLICATIONS

Australian Patent Examination Report No. 2 for Australian patent Application No. 2014389522 dated Sep. 7, 2016.
Japanese Office Action and translation for Application No. 2016-572227 dated Aug. 8, 2017.

* cited by examiner

TRANSPORTATION AND DELIVERY OF SET-DELAYED CEMENT COMPOSITIONS

BACKGROUND

Embodiments relate to cementing operations and, in certain embodiments, to methods and systems for the transportation and delivery of set-delayed cement compositions to a well site.

Cement compositions may be used in a variety of subterranean operations. For example, in subterranean well construction, a pipe string (e.g., casing, liners, expandable tubulars, etc.) may be run into a wellbore and cemented in place. The process of cementing the pipe string in place is commonly referred to as "primary cementing." In a typical primary cementing method, a cement composition may be pumped into an annulus between the walls of the wellbore and the exterior surface of the pipe string disposed therein. The cement composition may set in the annular space, thereby forming an annular sheath of hardened, substantially impermeable cement (i.e., a cement sheath) that may support and position the pipe string in the wellbore and may bond the exterior surface of the pipe string to the subterranean formation. Among other things, the cement sheath surrounding the pipe string may function to prevent the migration of fluids in the annulus and protect the pipe string from corrosion. Cement compositions may also be used in remedial cementing methods, for example, to seal cracks or holes in pipe strings or cement sheaths, to seal highly permeable formation zones or fractures, to place a cement plug, and the like. Cement compositions may also be used for the placement of a cement plug in plug-and-abandon operations.

A broad variety of cement compositions have been used in subterranean cementing operations. In some instances, set-delayed cement compositions have been used. Set-delayed cement compositions have an extended set in that they are specially formulated to remain in a pumpable fluid state for about one day or longer (e.g., about 7 days, about 2 weeks, about 2 years, or longer) at room temperature (e.g., about 80° F.) in storage. When desired for use, the set-delayed cement compositions should be capable of being activated whereby reasonable compressive strengths are developed. For example, a cement set accelerator may be added to a set-delayed cement composition whereby the composition sets into a hardened mass. Among other things, the set-delayed cement composition may be suitable for use in wellbore applications, for example, where it is desired to prepare the cement composition in advance. This may allow, for example, the cement composition to be stored prior to its use. In addition, this may allow, for example, the cement composition to be prepared at a convenient location and then transported to the job site. While set-delayed cement compositions have been developed heretofore, challenges exist with their successful use in subterranean cementing operations. For example, the successful preparation, storage, and transportation of the set-delayed cement composition may be problematic. Specifically, the set-delayed cement compositions typically contain significant quantities of solids that can settle or otherwise segregate in the mix water when stored for extended periods of time. This can prevent being able to use conventional pumping systems to circulate the material and/or remove it from storage containers in order to pump it downhole. Additionally, settling and/or segregation may also undesirably result in a non-homogenous composition, which can cause premature setting, late setting, and/or lack of setting of the composition.

BRIEF DESCRIPTION OF THE DRAWINGS

These drawings illustrate certain aspects of some of the embodiments of the present method, and should not be used to limit or define the method.

DETAILED DESCRIPTION

Embodiments relate to cementing operations and, in certain embodiments, to methods and systems for the transportation and delivery of set-delayed cement compositions to a well site. The disclosed techniques may be used with set-delayed cement compositions in a variety of surface and subterranean cementing applications, including primary and remedial cementing operations, as well as in plug-and-abandon operations, which may be onshore or offshore. In addition, the disclosed techniques may be used in horizontal, vertical, deviated, or otherwise non-linear wellbores in any type of subterranean formation. The disclosed techniques may be applicable to injection wells, monitoring wells, and production wells, including hydrocarbon or geothermal wells.

Figure 1:
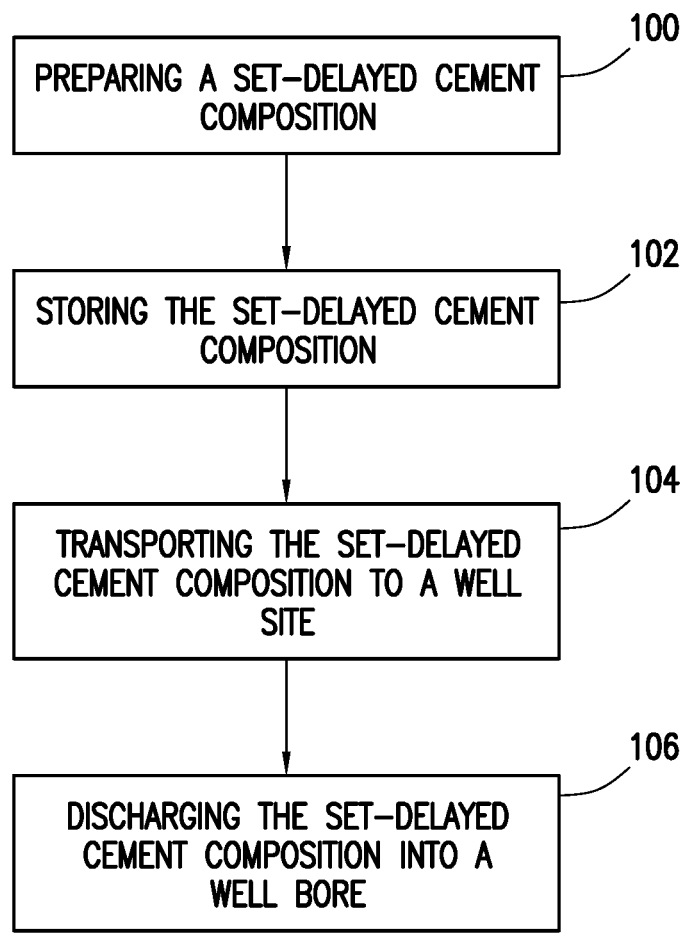
FIG. 1 is a flow chart of a method employing a set-delayed cement composition in well cementing in accordance with certain embodiments.

FIG. 1 illustrates an example method that may be employed for use of a set-delayed cement composition in well cementing. At block 100, the method may include preparing a set-delayed cement composition. At block 102, the method may include storing the set-delayed cement composition. At block 104, the method may include transporting the set-delayed cement composition to a well site. At block 106, the method may include discharging the set-delayed cement composition from a containment vessel into a wellbore. The containment vessel (e.g., containment vessel 108 on FIG. 2, containment vessel 108' on FIG. 3) used in the discharging (block 106) may also be used for preparing (block 100), storing (block 102), and/or transporting (block 104) of the set-delayed cement composition.

At block 100, the method may include preparing the set-delayed cement composition. As previously mentioned, set-delayed cement compositions refer to cement compositions that have been specially formulated to remain in a pumpable fluid state for an extended period of time in storage. The set-delayed cement composition may be intermittently stirred or otherwise agitated while in storage. For example, the set-delayed cement compositions may remain in a pumpable fluid state for about 1 day, about 2 weeks, about 2 years, or longer. After activation, the set-delayed cement compositions may develop reasonable compressive strength. A fluid is considered to be in a pumpable fluid state where the fluid has a consistency of less than 70 Bearden units of consistency ("Bc"), as measured on a pressurized consistometer in accordance with the procedure for determining cement thickening times set forth in API RP Practice 10B-2, *Recommended Practice for Testing Well Cements*, First Edition, July 2005. Examples of suitable set-delayed cement compositions that may be used with the method of FIG. 1 and other methods disclosed herein are described in more detail below.

The set-delayed cement composition may be prepared in accordance with a variety of different techniques. The dry ingredients (e.g. cement, pozzolan, lime, etc.) may be dry blended to form a dry blend. For example, the dry ingredients may be dry blended in bulk form, at a centralized location, such as at a cement bulk plant. The dry blend may be stored in dry bulk form or used immediately. At a desired time, the dry blend may be mixed with water and other liquid or dry ingredients to form the set-delayed cement composition. A variety of different equipment may be suitable for use in preparation of the set-delayed cement composition, such as batch or re-circulating mixers. Specialized containment vessels that contain stirring mixing blades, such as paddles, may be used for mixing the dry blend and water. Examples of containment vessels (e.g., containment vessel 108, containment vessel 108') that may be used in preparation of the set-delayed cement composition are described in more detail below with respect to FIGS. 2-4.

At block 102, the method may include storing the set-delayed cement composition. The set-delayed cement composition may be stored in the containment vessel used in its preparation or the set-delayed cement composition may be transferred to one or more different containment vessels for storage. The set-delayed cement composition may be held in liquid storage, which may be at the bulk plant or another location. In particular embodiments, the set-delayed cement composition may be transported offshore and stored at the well site on a drilling rig, for example. Because the cement composition is set-delayed, it should be capable of being held in liquid storage for an extended period of time. By way of example, the set-delayed cement composition may be held in liquid storage in a pumpable fluid state for at least about 1 day, about 7 days, about 10 days, about 20 days, about 30 days, about 40 days, about 50 days, about 60 days, or longer. The set-delayed cement composition may be intermittently agitated or otherwise stirred while in storage. The containment vessel holding the set-delayed cement composition may contain mixing blades, which may be used to intermittently stir the composition. During storage at the bulk plant and/or well site, additional additives (which may be dry materials or liquid additives) may be added to set-delayed cement composition to help maintain a pumpable fluid that is well mixed. For example, these additional additives may include, without limitation, viscosifiers, dispersants, set retarders, accelerators, fluid loss control additives, and combinations thereof.

At block 104, the method may include transporting the set-delayed cement composition to a well site. At the well site, the set-delayed cement composition may also be stored if not to be used immediately. For example, the set-delayed cement composition may be stored for about 1 day or longer until used in well cementing. The set-delayed cement composition may be intermittently agitated or otherwise stirred while at the well site. The set-delayed cement composition may be transported to the well site in the same containment vessel used for its preparation and/or storage. Alternatively, the set-delayed cement composition may be transferred to one or more different containment vessels for transport. The well site may be onshore or offshore, as desired for a particular application. Use of the present techniques may be particularly beneficial offshore where space onboard vessels may be limited because onsite bulk storage and mixing equipment may not be needed. Onsite bulk storage and mixing equipment may not be needed because the set-delayed cement composition may be pumped from the containment vessel into the wellbore. By eliminating the complex pumping and mixing equipment commonly used for cementing operations, the present techniques may greatly reduce the cost and complexity of cementing operations. The time required to rig up and perform certain cementing operations such as plug-and-abandon operations may be reduced up by at least 50% or more.

Samples of the set-delayed cement composition may be taken, for example, to ensure proper preparation. Laboratory testing of the samples may be performed to certify performance of the set-delayed cement composition. The samples may be taken before or after the storing step (block 102) and/or transporting step (block 104).

At block 106, the method may include pumping the set-delayed cement composition into the wellbore. The set-delayed cement composition may be pumped directly from the containment vessel without use of any additional onsite bulk storage and/or mixing equipment. In some embodiments, the set-delayed cement composition may be gravity fed to a pump (e.g., a centrifugal or other suitable pump) for pumping to a downhole pump for delivery into the wellbore. A cement set activator may be added to the set-delayed cement composition prior to, or while, the set-delayed cement composition is being pumped to the wellbore. For example, a cement set activator may be added directly to the containment vessel or, alternatively, added to a flowing stream of the set-delayed cement composition while it is being delivered to the wellbore. After activation, the set-delayed cement composition may set to form a hardened mass. For example, the set-delayed cement composition may set to form a harden mass after placement in the wellbore in a time period of from about 1 hour to about 12 hours or longer. For example, embodiments of the set-delayed cement compositions may set to form a hardened mass in a time period ranging between any of and/or including any of about 3 hours, about 6 hours, about 12 hours, about 1 day, or longer. The cement set activator and other additives that may be combined with the set-delayed cement composition at the well site may be transported to the well site by any suitable means known to those of ordinary skill in the art with the benefit of this disclosure.

As will be appreciated by those of ordinary skill in the art, the set-delayed cement composition may be pumped into the wellbore in a variety of different subterranean operations, including primary and remedial cementing as well as plug-and-abandon operations. By way of example, a set-delayed cement composition may be pumped into the wellbore and allowed to set. The set-delayed cement composition may set in the wellbore, in a near wellbore region, or in both.

In primary cementing, the set-delayed cement composition may be introduced into an annular space between a conduit located in a wellbore and the walls of a wellbore (and/or a larger conduit in the wellbore), wherein the wellbore penetrates the subterranean formation. The set-delayed cement composition may be allowed to set in the annular space to form an annular sheath of hardened cement. The set-delayed cement composition may form a barrier that prevents the migration of fluids in the wellbore. The set-delayed cement composition may also, for example, support the conduit in the wellbore.

In remedial cementing, a set-delayed cement composition may be used, for example, in squeeze-cementing operations or in the placement of cement plugs. By way of example, the set-delayed composition may be placed in a wellbore to plug an opening (e.g., a void or crack) in the formation, in a gravel pack, in the conduit, in the cement sheath, and/or between the cement sheath and the conduit (e.g., a microannulus).

In plug-and-abandon operations, the set-delayed cement composition may be used to form a plug in the wellbore to seal off the wellbore for abandonment. In performing plug-and-abandon operations, the set-delayed cement composition may be placed in the wellbore at a desired depth. The set-delayed cement composition should set in the wellbore, forming a hardened mass (e.g., a plug) that seals off selected intervals of the wellbore. The plug should prevent and/or reduce zonal communication and migration of fluids that may contaminate water-containing formations. It may be desirable in certain instances to form one or more plugs in the wellbore adjacent to hydrocarbon-producing formations and water-containing formations.

Figure 2:
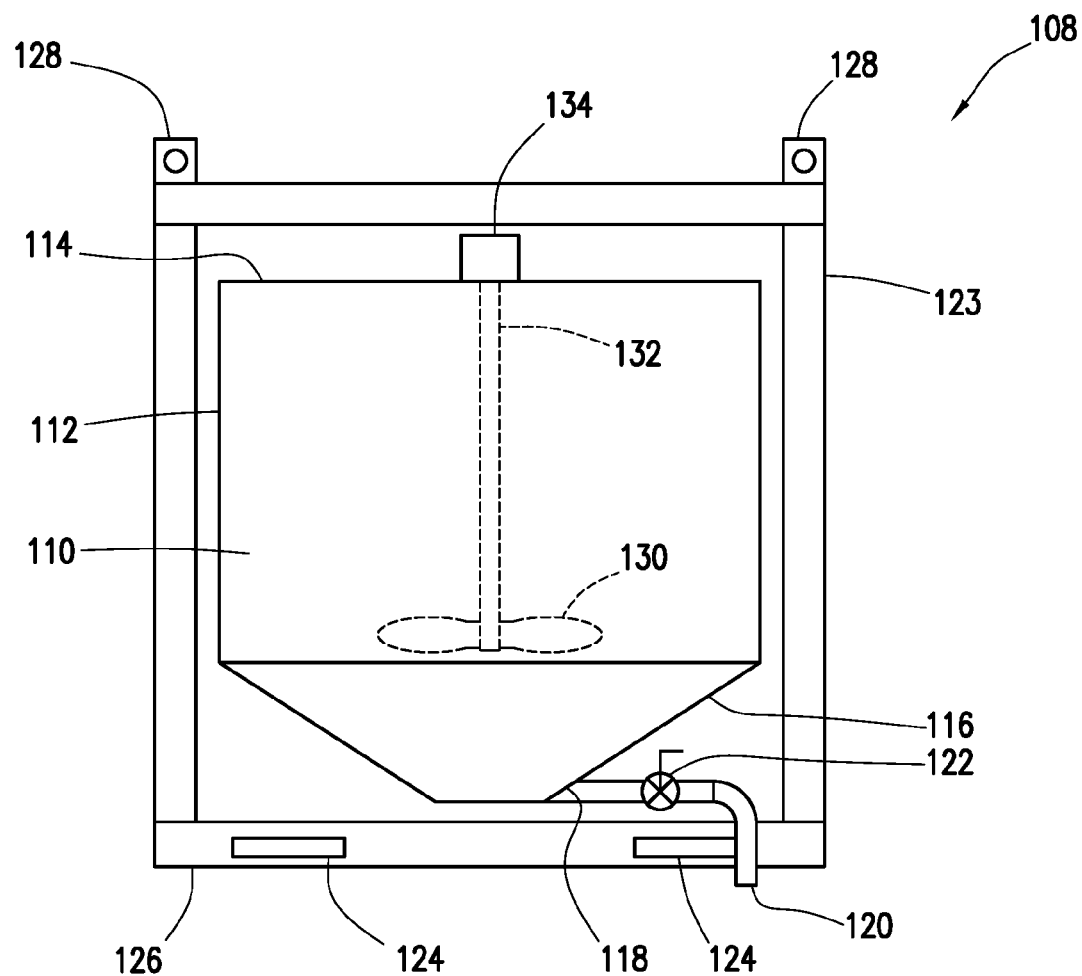
FIG. 2 is a schematic diagram illustrating a containment vessel that can be used with a set-delayed cement composition in accordance with certain embodiments.

Referring now to FIG. 2, an example containment vessel 108 for holding a set-delayed cement composition is shown. The containment vessel 108 may be used with the method described above with respect to FIG. 1, but may also be used with other methods that utilize a set-delayed cement composition in well cementing. The containment vessel 108 may have multiple functions. First, the containment vessel 108 may be used for preparing a set-delayed cement composition wherein the dry blend may be combined with water and then mixed in the containment vessel 108. Second, the containment vessel 108 may be used for storing of the set-delayed cement composition. Third, the containment vessel 108 may be portable and used for transportation of the set-delayed cement to a well site. The containment vessel 108 may be designed to meet Department of Transportation and offshore transportation and lifting regulations while in transit to the well site. Fourth, the containment vessel 108 may be used for additional storage of the set-delayed cement composition at the well site. Fifth, the set-delayed cement composition may be used as a discharge vessel from which the set-delayed cement composition may be fed to one or more pumps for delivery to the wellbore. It should be understood that the containment vessel 108 may be used to perform any combination of the preceding functions when using a set-delayed cement composition in well cementing. For example, the containment vessel 108 may be used in the preparation, storage, transportation, and/or discharge of the set-delayed cement composition into a wellbore.

The containment vessel 108 may comprise a mixing chamber 110 defined by a shell 112. The shell 112 may be generally cylindrical, rectangular, or any other suitable shape for holding and mixing of the set-delayed cement composition. The shell 112 may have a closed top 114. As illustrated, the shell 112 may have a tapered bottom portion 116. An outlet 118 may be defined in the tapered bottom portion 116 through which the set-delayed cement composition may exit the shell 112. An outlet conduit 120 may be coupled to the outlet 118 of the shell 112. A valve 122 may be disposed in the outlet conduit 120 for controlling the flow of the set-delayed cement composition out of the shell 112.

The containment vessel 108 may further comprise a frame 123, which may be coupled to the shell 112. The frame 123 may generally support and/or position the shell 112. The frame 123 may include one or more holes 124 (e.g., forklift holes) that may be used to facilitate transport of the containment vessel 108. As illustrated, the holes 124 may be disposed in the frame 123, which may be used to facilitate lifting of the containment vessel 108, for example, by a forklift. In the illustrated embodiment, the holes 124 are located in a bottom end 126 of the frame 123. The frame 123 may further include a lifting apparatus, such as tabs 128, which may facilitate lifting of the containment vessel 108.

The containment vessel 108 may further include mixing blades 130 mounted on a shaft 132. The shaft 132 may be disposed in the mixing chamber 110. As illustrated, the mixing blades 130 may be mounted on a lower end of the shaft 132. A motor 134 may be used to drive the shaft 132. Because rig air may be readily available at some well sites, the motor 134 may be an air motor in some embodiments. In other embodiments, the motor 134 may be an electric motor or a hydraulic motor. Accordingly, once the set-delayed cement composition has been stationary (e.g., for a day or longer), the rig air may be coupled to the motor 134, and the set-delayed cement composition may be stirred. While a variety of different shapes may be suitable, the mixing blades 130 may be paddle-shaped as shown in FIG. 2. The mixing blades 130 may be pitched or non-pitched as desired for a particular application. While FIG. 2 illustrates only two mixing blades 130, it should be understood that more or less mixing blades 130 may be used as a desired for a particular application. Moreover, the placement of the mixing blades 130 on the shaft 132 may also be varied from that depicted on FIG. 2.

The containment vessel 108 may be sized as desired for a particular operation. By way of example, the shell 112 of the containment vessel 108 may have a volume (up to the closed top 114) of from about 400 gallons to about 2,000 gallons. However, the shell 112 may have a size outside these ranges as desired for a particular application. In some embodiments, the size of the shell 112 may be limited to about 2,000 gallons, to provide a system that can be reasonably transported and lifted to a well site or platform. The size of the shell 112 may be limited, in some instances, by the lift capacity of the cranes available on location. In most cases, the capacity of the shell 112 may have an upper limit of about 4,000 gallons.

Figure 3:
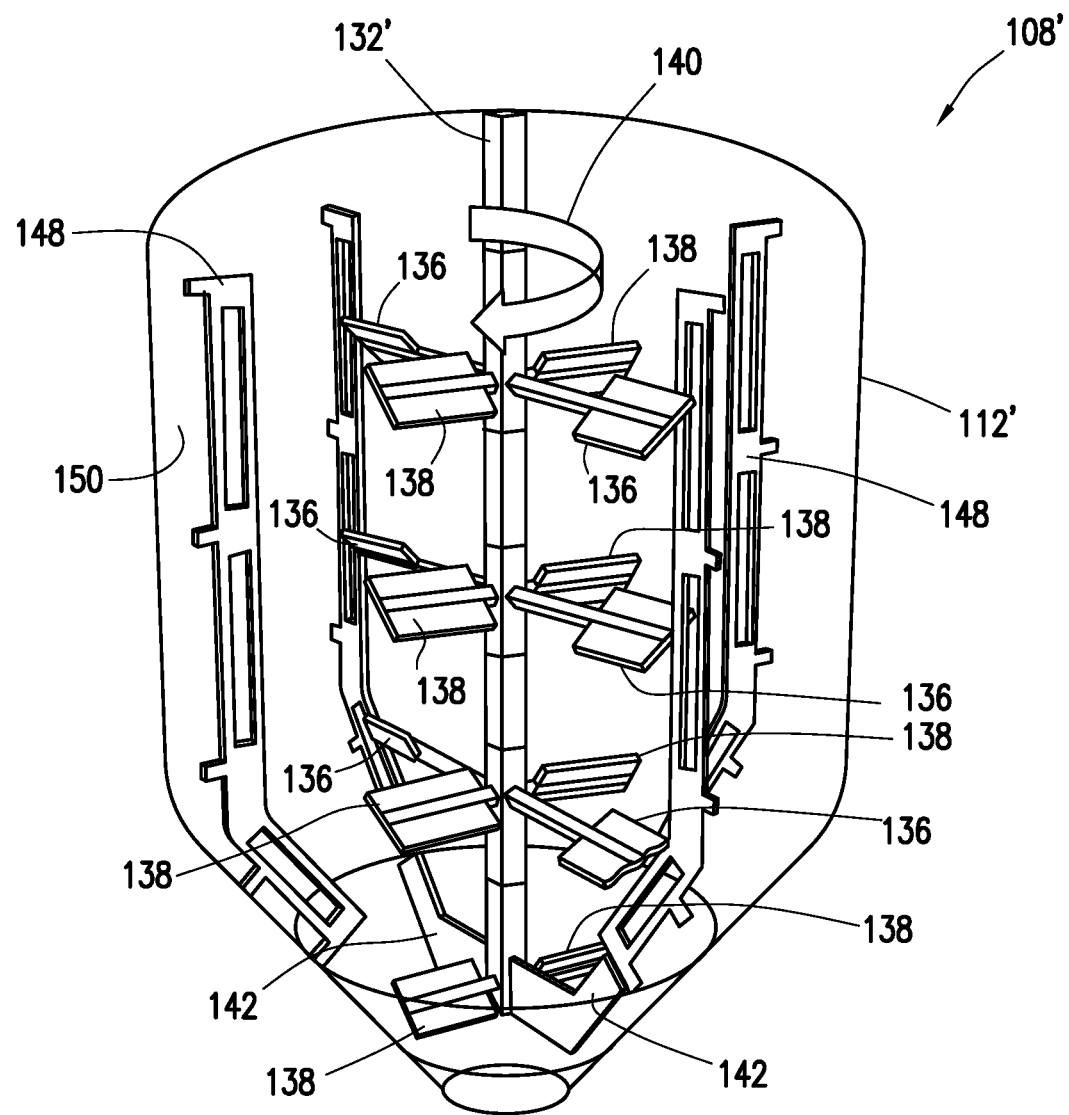
FIG. 3 is a schematic diagram illustrating an alternative containment vessel that can be used with a set-delayed cement composition in accordance with certain embodiments.
Figure 4:
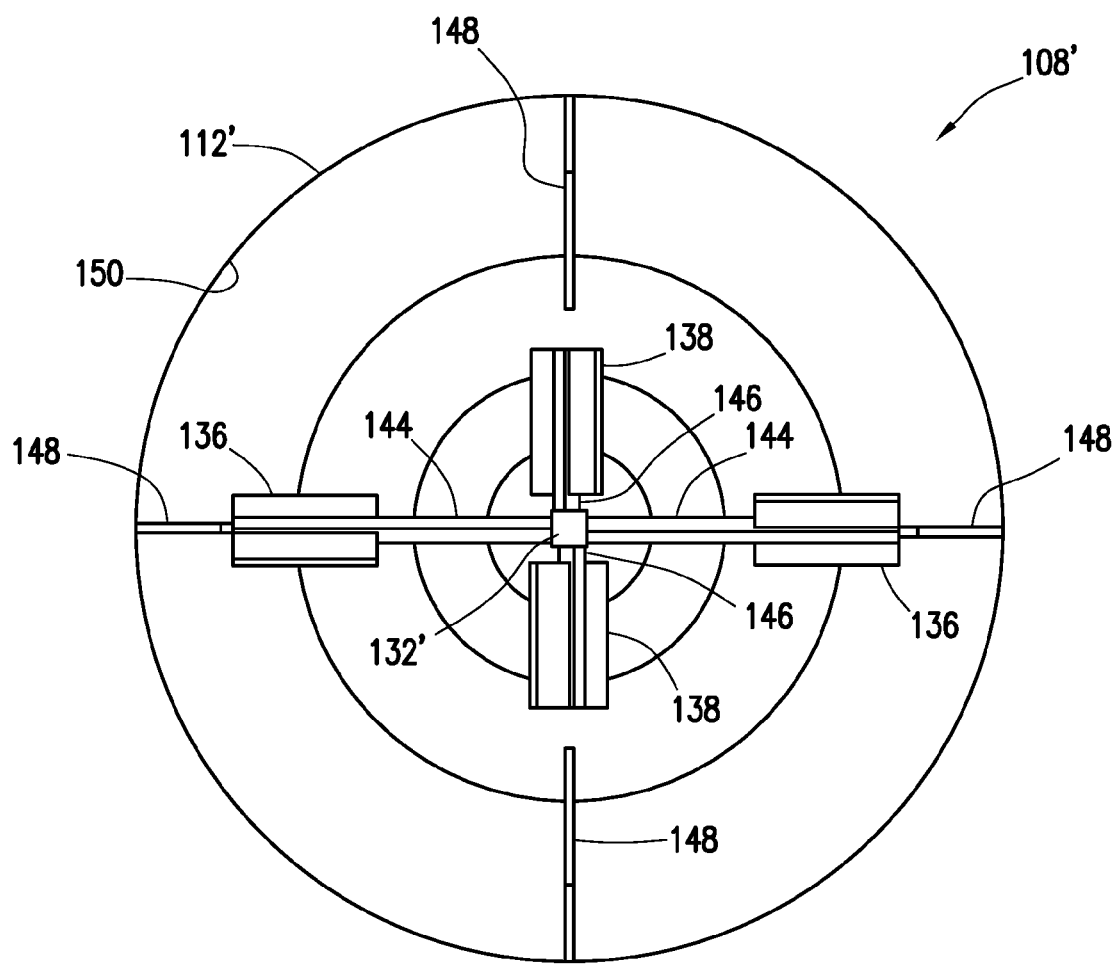
FIG. 4 is a top view of the containment vessel of FIG. 3.

Referring now to FIGS. 3 and 4, another example of a containment vessel 108' is shown. The containment vessel 108' shown on FIGS. 3 and 4 may be used for the same functions as described above in connection with FIG. 2. In the illustrated embodiment, some of the components of the containment vessel 108' are removed for illustrative purposes. For example, the containment vessel 108' may further comprise a frame 123, motor 134, and outlet 118, as shown on FIG. 2. The containment vessel 108' of FIGS. 3 and 4 is similar to that shown on FIG. 2, except that instead of having two mixing blades 130 on a lower end of the shaft 132, the containment vessel 108 shown on FIGS. 3 and 4 includes downward facing mixing blades 136 and upward facing mixing blades 138 arranged vertically on the shaft 132'. As represented by arrow 140 on FIG. 3, the shaft 132' may turn counter-clockwise in the shell 112'. It should be understood that the downward facing mixing blades 136 and upward facing mixing blades 138 are classified as downward or upward facing based on the direction of shaft rotation, which in this embodiment is counter-clockwise. The downward facing mixing blades 136 and a upward facing mixing blades 138 may be at oblique angles with respect to the radial plane of the shaft 132'.

As illustrated, the shaft 132' may be divided into four vertical levels of downward facing mixing blades 136 and upward facing mixing blades 138. In the illustrated embodiment, a pair of downward facing mixing blades 136 and a pair of upward facing mixing blades 138 are shown at three of the vertical levels of the shaft 132'. However, the lowest level of the shaft 132' includes a pair of upward facing mixing blades 138 and a pair of optional right-angle mixing blades 142. The right-angle mixing blades 142 may be used in place of the downward facing mixing blades 136 at one or more levels of the shaft 132', as shown on FIG. 3. The right-angle mixing blades 142 may be at an angle of about 90° with respect to the radial plane of the shaft 132'. It should be understand that alternative configurations of the downward facing mixing blades 136 and upward facing mixing blades 138 may be used in accordance with present embodiments. For example, the type and location of the downward facing mixing blades 136 and upward facing mixing blades 138 may be modified without varying from the scope of the present disclosure.

The downward facing mixing blades 136 and upward facing mixing blades 138 may be coupled to the shaft 132' by arms. As best seen on FIG. 4, the downward facing mixing blades 136 may be coupled to the shaft 132' by long arms 144, and the upward facing mixing blades 138 may be coupled to the shaft 132' by short arms 146. Varying the length of the arms (e.g., long arms 144, short arms 146) used in connection of the downward facing mixing blades 136 and upward facing mixing blades 138 to the shell 112' can impact the uniformity of mixing of the set-delayed cement composition in the containment vessel 108'.

With reference to FIGS. 3 and 4, the containment vessel 108' may further include baffles 148. The baffles 148 may be included on the containment vessel 108' to improve the uniformity of mixing of the set-delayed cement composition. As illustrated, the baffles 148 may be mounted on an interior surface 150 of the shell 112'. As best seen in FIG. 4, four baffles 148 may be coupled to the shell 112'. However, the number of the baffles 148 used in the containment vessel 108' may be varied as desired for a particular application. In the illustrated embodiment, the baffles 148 are uniformly arranged in the shell 112' and extend vertically down the inner surface 150 of the shell 112'.

A mixing vessel, such as the containment vessel 108 or containment vessel 108', which may be used for the preparation, storing, and/or transporting a set-delayed cement composition, may be designed to optimize mixing of the set-delayed cement composition to thus provide a set-delayed cement composition that is homogenous and can remain in storage for an extended period of time without undesired gelation and solids settlings. Mixing effectiveness and efficiency of non-Newtonian fluids, such as Herschel-Bulkley types, may be dependent upon designing the mixing vessels and stirring blades/devices so as to achieve uniform velocity and uniform shear rate. The more uniform the velocity profiles tend to improve the uniformity of shear rates. With Herschel-Bulkley-type fluids, the viscosity should be very sensitive to shear rate. For example, in this case, low shear rates may result in a thick, viscous set-delayed cement composition while high shear rates may result in creating a low-viscosity set-delayed cement composition. In the art of designing mixing devices, it is recognized that large variations of viscosity can significantly increase the difficulty in achieving uniform mixing. Therefore, two approaches are presented herein, both aimed at achieving uniform shear rates throughout the mixing vessel: maximizing the velocity uniformity; and maximizing the uniformity of the "Second Invariant." To achieve thus, the velocity uniformity index ("VUI") and uniformity index of the Second Invariant ("UISI") are both maximized. One technique that may be used to optimize mixing may include maximizing the uniformity of shear rate in the fluid while mixing in the mixing vessel. The uniformity of shear rate may be maximized by maximizing the VUI and the UISI. An example technique for maximizing these two variables will be described in more detail in the following section.

Finite element analysis ("FEA") modeling may be used to maximize the VUI while also maximizing the UISI. Equation [1] below provides the Herschel-Bulkley ("HB") viscometric model that may be used to model the rheology of set-delayed cement compositions disclosed herein:

$$\tau = \tau_o + K_{hb}(\dot{\gamma})^{n_{hb}} \quad [1]$$

wherein: $\Delta$ is the shear stress function; $\tau_o$ is the yield stress; $K_{hb}$ is the consistency coefficient equal to the apparent viscosity at a shear rate of 1.0 (1/sec); $\gamma$ is shear rate and $n_{hb}$ is the shear thinning index, which ranges from 0 to 0.99 for shear thinning fluids (known as pseudo-plastic fluids), and if $n_{hb}=1.0$ the fluid is Newtonian if $\tau_o$ is zero and Bingham Plastic if $\tau_o$ is >0, and if $n_{hb}>1.0$ the fluid is dilatant or shear thickening.

The HB model was selected because it was suitable for prediction of a wide range of flow behaviors of the set-delayed cement compositions. Set-delayed cement compositions have been tested that range from being pseudo-plastic to Bingham like ($n_{hb}=1$) to dilatant. However, the present technique should not be limited to the HB model and other suitable models may be used to model the fluid rheology.

The VUI may defined by Equation [2] below:

$$VUI = 1/\{\Sigma_{m=1}^p ||\overline{v_m}| - |\overline{\overline{v_m}}||\} \quad [2]$$

wherein:

$$|\overline{\overline{v_m}}| = \Sigma_{m=1}^p \frac{|\overline{v_m}|}{p} \quad [3]$$

$$|\overline{v_m}| = [|v_{x,m}| + |v_{y,m}| + |v_{z,m}|]/3 \quad [4]$$

$v_{x,m}$, $v_{y,m}$, and $v_{z,m}$ are the velocity vectors in volume element m, wherein m is from 1 to p, p being the number of volume elements in the mixing vessel, such as the containment vessel 108 or 108'.

Darby, R. 1976. Viscoelastic Fluids, Marcel Dekker, pages 191-194, defines the Second Invariant (–II) of the strain rate tensor for Cartesian coordinates by Equation [5] as follows:

$$-II = 2\left\{\left(\frac{\partial v_x}{\partial x}\right)^2 + \left(\frac{\partial v_y}{\partial y}\right)^2 + \left(\frac{\partial v_z}{\partial z}\right)^2\right\} + \left(\frac{\partial v_y}{\partial x} + \frac{\partial v_x}{\partial y}\right)^2 + \left(\frac{\partial v_z}{\partial y} + \frac{\partial v_y}{\partial z}\right)^2 + \left(\frac{\partial v_x}{\partial z} + \frac{\partial v_z}{\partial x}\right)^2 \quad [5]$$

The UISI may be defined in Equation [6] as follows:

$$UISI = 1/\{\text{Standard Deviation of } (-II)_m\} \text{ for } m=1 \text{ to } p. \quad [6]$$

Equation [6] may be solved for volumetric elements (m) in the mixing vessel, such as the containment vessel 108 or 108', using Computational Fluid Dynamics FEA modeling to compute the value of Equation [5] for each value of m using Equation [1] for the viscosity function relating strain rate (shear rate) to shear stress. The containment vessel 108 or 108' or other suitable mixing vessel may be designed in accordance with this technique to maximize the VUI and the UISI. By way of example, the volume and type, number, and arrangement of mixing elements may be modified to maximize these two variables.

Figure 5:
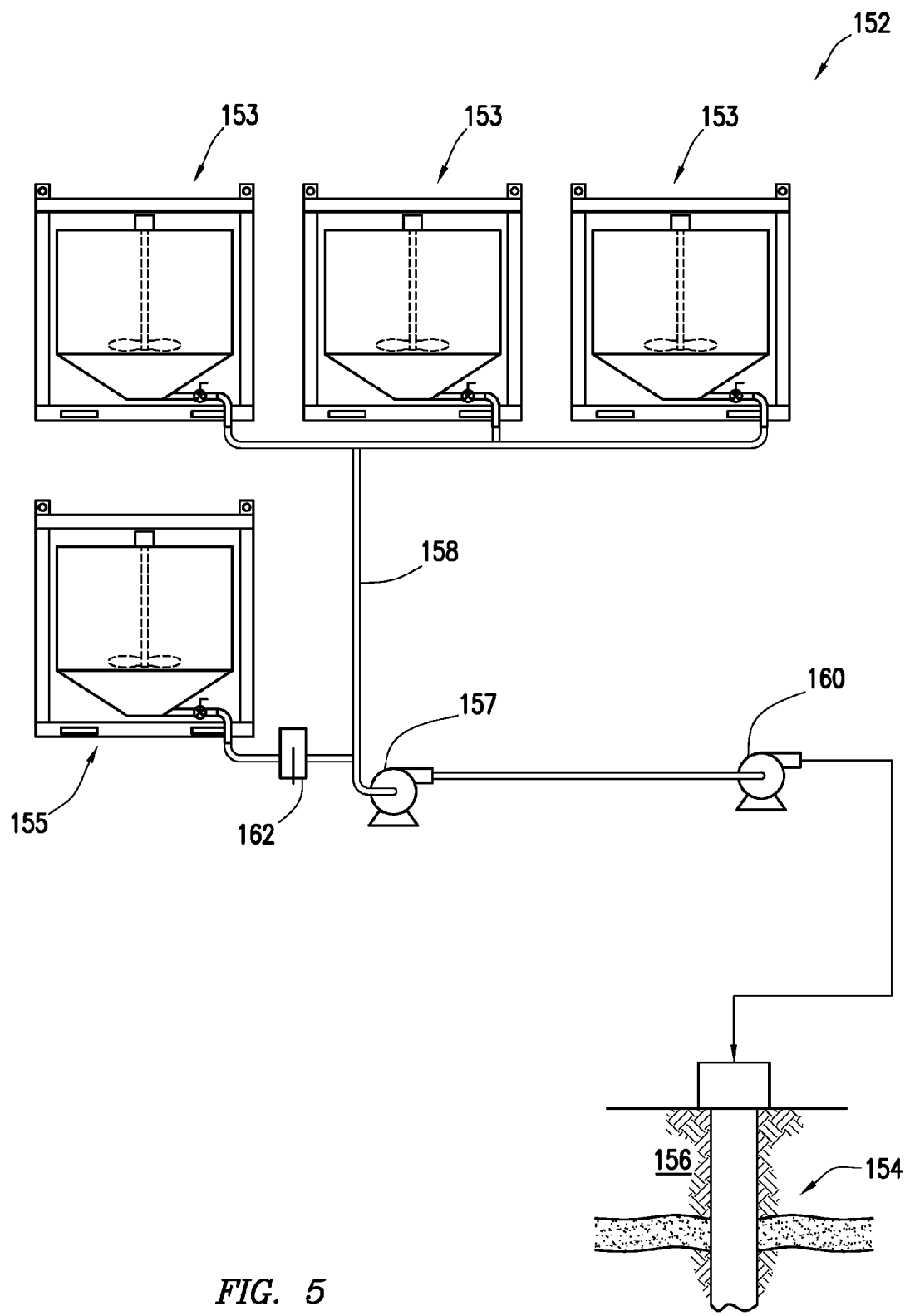
FIG. 5 is a schematic diagram showing a cementing system for use with a set-delayed cement composition in well cementing in accordance with certain embodiments.

Referring now to FIG. 5, a cementing system 152 is shown that may be used for delivery of the set-delayed cement composition into a wellbore 154 penetrating a subterranean formation 156. The cementing system 152 may comprise one or more discharge vessels 153 that may contain a set-delayed cement composition. In contrast to prior systems, the set-delayed cement composition may be delivered to the wellbore 154 from the discharge vessels 153 without the need for any additional blending or mixing equipment. In particular, the discharge vessels 153 may be used for discharge, as well as the preparation, storage, and/or transportation of the set-delayed cement composition. Set-delayed cement compositions that may be used with the cementing system 152 are described in more detail below. While three of the discharge vessels 153 are shown, the cementing system 152 may comprise more or less than three discharge vessels 153 based on the desired volume of the set-delayed cement composition and capacity of the discharge vessels 153. The design of the discharge vessels 153 should not be limited to that shown on FIG. 4. For example, the containment vessel 108 (e.g., FIG. 2) or containment vessel 108' (e.g., FIGS. 3 and 4) may be used as one or more of the discharge vessels 153 in the cementing system 152. Other suitable configurations of a vessel capable of preparing, storing, and/or transporting the set-delayed cement composition may also be used in the cementing system 152. It should be understood that the cementing system 152 may be used in conjunction with the techniques disclosed herein, such as the method disclosed on FIG. 1 for use of a set-delayed cement composition in well cementing.

The cementing system 152 may also comprise one or more accelerant vessels 155 that contain a cement set accelerator. The accelerant vessels 155 may be the same or different than the discharge vessel 153 used in connection with the set-delayed cement composition. Any suitable vessel for preparation, storing, and/or transporting the cement set accelerator to the well site may be used with the cementing system 152. Cement set accelerators that may be used are described in more detail below.

A pump 157 may be coupled to the discharge vessel 153 and the accelerant vessels 155 by a manifold 158. The pump 157 may be one of several types of pumps, including, but not limited to: a centrifugal pump; a positive displacement pump; a progressive cavity pump; a gear pump; a screw pump; and the like. The pump 157 may withdraw the set-delayed cement composition and the cement set accelerator from their respective vessels and supply the combined mixture to a downhole pump 160. The downhole pump 160 may include, but not be limited to: a centrifugal pump; a positive displacement pump; a progressive cavity pump; a gear pump; a screw pump; and the like. A liquid additive pump 162, which may be controlled automatically or manually, may be used to control the amount of the cement accelerator to the suction of the pump 157. The liquid additive pump 162 may include, but not be limited to: a centrifugal pump; a positive displacement pump; a progressive cavity pump; a gear pump; a screw pump; and the like.

Figure 6:
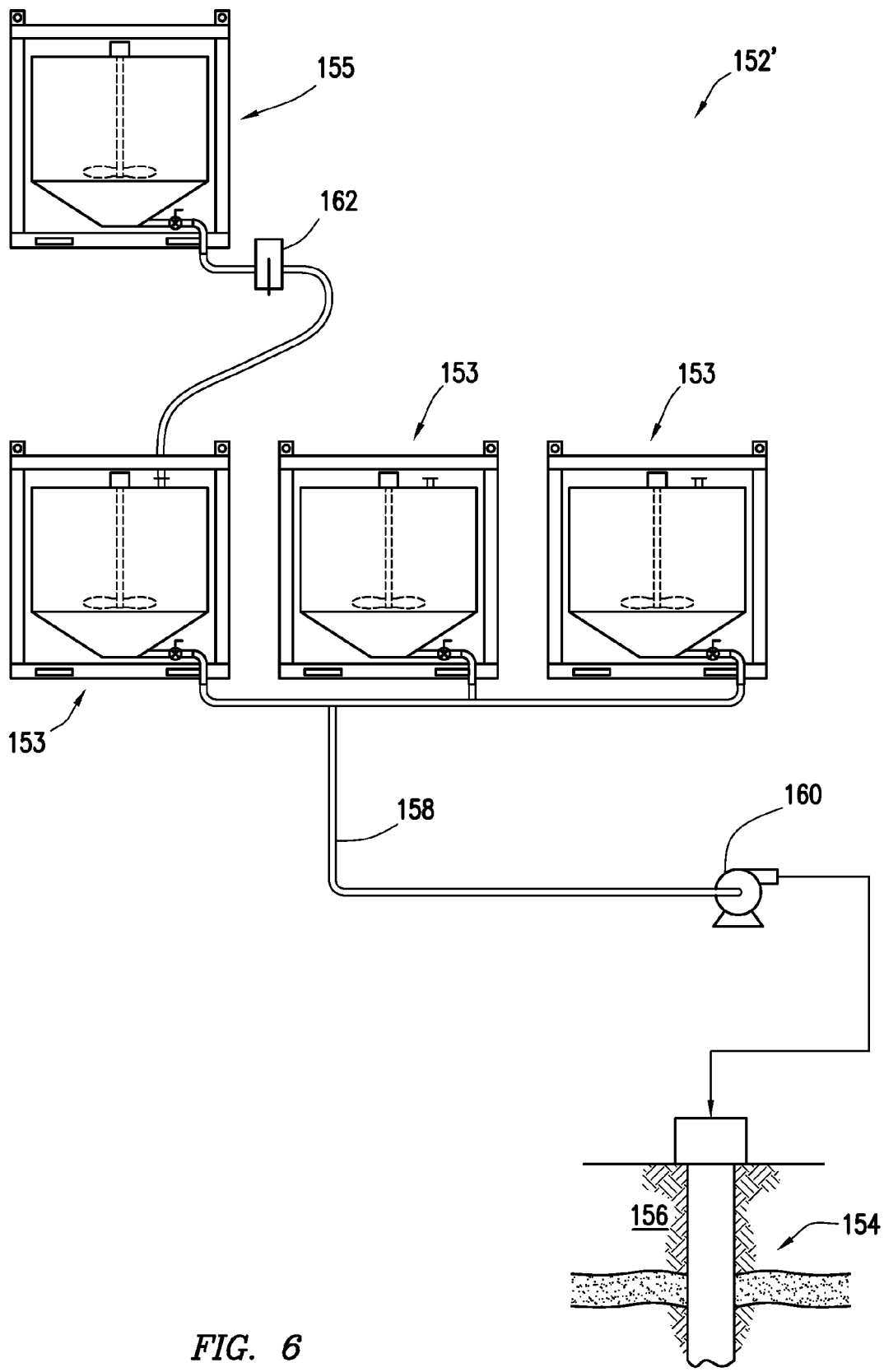
FIG. 6 is a schematic diagram showing an alternative system for use with a set-delayed cement composition in well cementing in accordance with certain embodiments.

Referring now to FIG. 6, an alternative cementing system 152' is illustrated that may be used for delivery of the set-delayed cement composition into a wellbore 154 penetrating a subterranean formation 156. As illustrated by FIG. 6, the cementing system 152' may comprise discharge vessels 153 coupled to downhole pump 160 by the manifold 158. The cementing system 152' may further comprise one or more accelerant vessels 155. In contrast to the cementing system 152 shown on FIG. 5, the accelerant vessels 155 shown on FIG. 6 may be configured for delivery of the cement set accelerator to the discharge vessels 153 instead of the suction of the pump 157 (e.g., FIG. 5). The liquid additive pump 162 may be used for delivery of the cement set accelerator to the discharge vessels 153. The discharge vessels 153 may be used to mix the set-delayed cement composition and the cement set accelerator. Samples of this mixture may be taken and tested prior to delivery into the wellbore 154. From the discharge vessels 153, the mixture of the set-delayed cement composition and the cement set accelerator may be fed to the downhole pump 160 and pumped into the wellbore 154.

Set-delayed cement compositions that may be used with the cementing system 152' are described in more detail below. The design of the discharge vessels 153 should not be limited to that shown on FIG. 6. For example, the containment vessel 108 (e.g., FIG. 2) or containment vessel 108' (e.g., FIGS. 3 and 4) may be used as one or more of the discharge vessels 153 in the cementing system 152'. Other suitable configurations of a vessel capable of preparing, storing, and/or transporting the set-delayed cement composition may also be used in the cementing system 152'. It should be understood that the cementing system 152' may be used in conjunction with the techniques disclosed herein, such as the method disclosed on FIG. 1 for use of a set-delayed cement composition in well cementing.

As described above, the disclosed techniques may be used with set-delayed cement composition. A variety of different set-delayed cement compositions may be used that generally may comprise water, a settable component, and a set retarder. One set-delayed cement composition may comprise water, pumice, lime, and a set retarder. Optionally, the set-delayed cement compositions may further comprise a dispersant. At a desired time, a cement set activator may be used to activate the set-delayed cement composition. The set-delayed cement compositions may remain in a pumpable fluid state for at least about 1 day, about 2 weeks, about 2 years, or longer. Advantageously, the set-delayed cement compositions may develop reasonable compressive strengths after activation at relatively low temperatures.

The water may be from any source provided that it does not contain an excess of compounds that may undesirably affect other components in the set-delayed cement compositions. For example, a set-delayed cement composition may comprise fresh water or salt water. Salt water generally may include one or more dissolved salts therein and may be saturated or unsaturated as desired for a particular application. Seawater or brines may be suitable for use in embodiments. Further, the water may be present in an amount sufficient to form a pumpable slurry. In certain embodiments, the water may be present in the set-delayed cement composition in an amount in the range of from about 33% to about 200% by weight of the pumice. In certain embodiments, the water may be present in the set-delayed cement compositions in an amount in the range of from about 35% to about 70% by weight of the pumice. One of ordinary skill in the art with the benefit of this disclosure will recognize the appropriate amount of water for a chosen application.

Pumice may be present in the set-delayed cement compositions. Generally, pumice is a volcanic rock that can exhibit cementitious properties in that it may set and harden in the presence of hydrated lime and water. The pumice may also be ground. An example of a suitable pumice is available from Hess Pumice Products, Inc., Malad, Id., as DS-325 lightweight aggregate, having a particle size of less than about 15 microns. It should be appreciated that particle sizes too small may have mixability problems while particle sizes too large may not be effectively suspended in the compositions. One of ordinary skill in the art, with the benefit of this disclosure, should be able to select a particle size for the pumice suitable for a chosen application.

Lime may be present in the set-delayed cement compositions. In some embodiments, the lime may be provided as quicklime (calcium oxide) which hydrates when mixed with water to form hydrated lime. In some embodiments, the lime may be provided as hydrated lime. As used herein, the term "hydrated lime" will be understood to mean calcium hydroxide. The lime may be included in embodiments of the set-delayed cement compositions, for example, to form a hydraulic composition with the pumice. For example, the lime may be included in a pumice-to-lime weight ratio of about 10:1 to about 1:1 or 3:1 to about 5:1. Where present, the lime may be included in the set-delayed cement compositions in an amount in the range of from about 10% to about 100% by weight of the pumice, for example. In some embodiments, the lime may be present in an amount ranging between any of and/or including any of about 10%, about 20%, about 40%, about 60%, about 80%, or about 100% by weight of the pumice. In some embodiments, the cementitious components present in the set-delayed cement composition may consist essentially of the pumice and the lime. For example, the cementitious components may primarily comprise the pumice and the lime without any additional components (e.g., Portland cement, fly ash, slag cement) that hydraulically set in the presence of water. One of ordinary skill in the art, with the benefit of this disclosure, will recognize the appropriate amount of the lime to include for a chosen application.

A set retarder maybe present in the set-delayed cement compositions. A broad variety of set retarders may be suitable for use in the set-delayed cement compositions. For example, the set retarder may comprise phosphonic acids, such as ethylenediamine tetra(methylene phosphonic acid), diethylenetriamine penta(methylene phosphonic acid), etc.; lignosulfonates, such as sodium lignosulfonate, calcium lignosulfonate, etc.; salts such as stannous sulfate, lead acetate, monobasic calcium phosphate, organic acids, such as citric acid, tartaric acid, etc.; cellulose derivatives such as hydroxyl ethyl cellulose (HEC) and carboxymethyl hydroxyethyl cellulose (CMHEC); synthetic co- or terpolymers comprising sulfonate and carboxylic acid groups such as sulfonate-functionalized acrylamide-acrylic acid copolymers; borate compounds such as alkali borates, sodium metaborate, sodium tetraborate, potassium pentaborate; derivatives thereof, or mixtures thereof. Examples of suitable set retarders include, among others, phosphonic acid derivatives. One example of a suitable set retarder is Micro Matrix® cement retarder, available from Halliburton Energy Services, Inc. Generally, the set retarder may be present in the set-delayed cement compositions in an amount sufficient to delay the setting for a desired time. In some embodiments, the set retarder may be present in the set-delayed cement compositions in an amount in the range of from about 0.01% to about 10% by weight of the pumice. In specific embodiments, the set retarder may be present in an amount ranging between any of and/or including any of about 0.01%, about 0.1%, about 1%, about 2%, about 4%, about 6%, about 8%, or about 10% by weight of the pumice. One of ordinary skill in the art, with the benefit of this disclosure, will recognize the appropriate amount of the set retarder to include for a chosen application.

As previously mentioned, the set-delayed cement compositions may optionally comprise a dispersant. Examples of suitable dispersants include, without limitation, sulfonated-formaldehyde-based dispersants (e.g., sulfonated acetone formaldehyde condensate), examples of which may include Daxad® 19 dispersant available from Geo Specialty Chemicals, Ambler, Pa. Other suitable dispersants may be polycarboxylated ether dispersants such as Liquiment® 5581F and Liquiment®514L dispersants available from BASF Corporation Houston, Tex.; or Ethacryl™ G dispersant available from Coatex, Genay, France. An additional example of a suitable commercially available dispersant is CFR™-3 dispersant, available from Halliburton Energy Services, Inc, Houston, Tex. The Liquiment® 514L dispersant may comprise 36% by weight of the polycarboxylated ether in water. While a variety of dispersants may be used in accordance with embodiments, polycarboxylated ether dispersants may be particularly suitable for use in some embodiments. Without being limited by theory, it is believed that polycarboxylated ether dispersants may synergistically interact with other components of the set-delayed cement composition. For example, it is believed that the polycarboxylated ether dispersants may react with certain set retarders (e.g., phosphonic acid derivatives) resulting in formation of a gel that suspends the pumice and hydrated lime in the composition for an extended period of time.

In some embodiments, the dispersant may be included in the set-delayed cement compositions in an amount in the range of from about 0.01% to about 5% by weight of the pumice. In specific embodiments, the dispersant may be present in an amount ranging between any of and/or including any of about 0.01%, about 0.1%, about 0.5%, about 1%, about 2%, about 3%, about 4%, or about 5% by weight of the pumice. One of ordinary skill in the art, with the benefit of this disclosure, will recognize the appropriate amount of the dispersant to include for a chosen application.

Other additives suitable for use in subterranean cementing operations also may be included in embodiments of the set-delayed cement compositions. Examples of such additives include, but are not limited to: weighting agents, lightweight additives, gas-generating additives, mechanical-property-enhancing additives, lost-circulation materials, filtration-control additives, fluid-loss-control additives, defoaming agents, foaming agents, thixotropic additives, and combinations thereof. In embodiments, one or more of these additives may be added to the set-delayed cement compositions after storing but prior to the placement of a set-delayed cement composition into a subterranean formation. A person having ordinary skill in the art, with the benefit of this disclosure, should readily be able to determine the type and amount of additive useful for a particular application and desired result.

Those of ordinary skill in the art will appreciate that embodiments of the set-delayed cement compositions generally should have a density suitable for a particular application. By way of example, the set-delayed cement compositions may have a density in the range of from about 4 pounds per gallon ("lb/gal") to about 20 lb/gal. In certain embodiments, the set-delayed cement compositions may have a density in the range of from about 8 lb/gal to about 17 lb/gal. Embodiments of the set-delayed cement compositions may be foamed or unfoamed or may comprise other means to reduce their densities, such as hollow microspheres, low-density elastic beads, or other density-reducing additives known in the art. In embodiments, the density may be reduced after storing the composition, but prior to placement in a subterranean formation. Those of ordinary skill in the art, with the benefit of this disclosure, will recognize the appropriate density for a particular application.

As previously mentioned, the set-delayed cement compositions may have a delayed set in that they remain in a pumpable fluid state for at least one day (e.g., at least about 1 day, about 2 weeks, about 2 years or more) at room temperature (e.g., about 80° F.) in storage. It should be understood that the set-delayed cement compositions may be periodically stirred while in storage. For example, the set-delayed cement compositions may remain in a pumpable fluid state for a period of time from about 1 day to about 7 days or more. In some embodiments, the set-delayed cement compositions may remain in a pumpable fluid state for at least about 1 day, about 7 days, about 10 days, about 20 days, about 30 days, about 40 days, about 50 days, about 60 days, or longer.

When desired for use, embodiments of the set-delayed cement compositions may be activated (e.g., by combination with an activator) to set into a hardened mass. The term "cement set activator" or "activator", as used herein, refers to an additive that activates a set-delayed or heavily retarded cement composition and may also accelerate the setting of the set-delayed, heavily retarded, or other cement composition. By way of example, embodiments of the set-delayed cement compositions may be activated to form a hardened mass in a time period in the range of from about 1 hour to about 12 hours. For example, embodiments of the set-delayed cement compositions may set to form a hardened mass in a time period ranging between any of and/or including any of about 1 day, about 2 days, about 4 days, about 6 days, about 8 days, about 10 days, or about 12 days.

Embodiments may include the addition of a cement set activator to the set-delayed cement compositions. Examples of suitable cement set activators include, but are not limited to: zeolites, amines such as triethanolamine, diethanolamine; silicates such as sodium silicate; zinc formate; calcium acetate; Groups IA and IIA hydroxides such as sodium hydroxide, magnesium hydroxide, and calcium hydroxide; monovalent salts such as sodium chloride; divalent salts such as calcium chloride; nanosilica (i.e., silica having a particle size of less than or equal to about 100 nanometers); polyphosphates; and combinations thereof. Some embodiments may include a cement set activator comprising nanosilica. As used herein, the term "nanosilica" refers to silica having a particle size of less than or equal to about 100 nanometers ("nm"). In some embodiments, a combination of the polyphosphate and a monovalent salt may be used for activation. The monovalent salt may be any salt that dissociates to form a monovalent cation, such as sodium and potassium salts. Specific examples of suitable monovalent salts include potassium sulfate, and sodium sulfate. A variety of different polyphosphates may be used in combination with the monovalent salt for activation of the set-delayed cement compositions, including polymeric metaphosphate salts, phosphate salts, and combinations thereof. Specific examples of polymeric metaphosphate salts that may be used include sodium hexametaphosphate, sodium trimetaphosphate, sodium tetrametaphosphate, sodium pentametaphosphate, sodium heptametaphosphate, sodium octametaphosphate, and combinations thereof. A specific example of a suitable cement set activator comprises a combination of sodium sulfate and sodium hexametaphosphate. In particular embodiments, the activator may be provided and added to the set-delayed cement composition as a liquid additive, for example, a liquid additive comprising a monovalent salt, a polyphosphate, and optionally a dispersant.

Some embodiments may include a cement set activator comprising a combination of a monovalent salt and a polyphosphate. The monovalent salt and the polyphosphate may be combined prior to addition to the set-delayed cement composition or may be separately added to the set-delayed cement composition. The monovalent salt may be any salt that dissociates to form a monovalent cation, such as sodium and potassium salts. Specific examples of suitable monovalent salts include potassium sulfate and sodium sulfate. A variety of different polyphosphates may be used in combination with the monovalent salt for activation of the set-delayed cement compositions, including polymeric metaphosphate salts, phosphate salts, and combinations thereof, for example. Specific examples of polymeric metaphosphate salts that may be used include sodium hexametaphosphate, sodium trimetaphosphate, sodium tetrametaphosphate, sodium pentametaphosphate, sodium heptametaphosphate, sodium octametaphosphate, and combinations thereof. A specific example of a suitable cement set activator comprises a combination of sodium sulfate and sodium hexametaphosphate. Interestingly, sodium hexametaphosphate is also known in the art to be a strong retarder of Portland cements. Because of the unique chemistry of polyphosphates, polyphosphates may be used as a cement set activator for embodiments of the set-delayed cement compositions disclosed herein. The ratio of the monovalent salt to the polyphosphate may range, for example, from about 5:1 to about 1:25 or from about 1:1 to about 1:10. Embodiments of the cement set activator may comprise the monovalent salt and the polyphosphate salt in a ratio (monovalent salt to polyphosphate) ranging between any of and/or including any of about 5:1, 2:1, about 1:1, about 1:2, about 1:5, about 1:10, about 1:20, or about 1:25.

In some embodiments, the combination of the monovalent salt and the polyphosphate may be mixed with a dispersant and water to form a liquid additive for activation of a set-delayed cement composition. Examples of suitable dispersants include, without limitation, the previously described dispersants, such as sulfonated-formaldehyde-based dispersants and polycarboxylated ether dispersants. One example of a suitable sulfonated-formaldehyde-based dispersant is a sulfonated acetone formaldehyde condensate, available from Halliburton Energy Services, Inc., as CFR-3™ dispersant. One example of a suitable polycarboxylated ether dispersant is Liquiment® 514L or 5581F dispersants, available from BASF Corporation, Houston, Tex.

The cement set activator may be added to embodiments of the set-delayed cement composition in an amount sufficient to induce the set-delayed cement composition to set into a hardened mass. In certain embodiments, the cement set activator may be added to the set-delayed cement composition in an amount in the range of about 0.1% to about 20% by weight of the pumice. In specific embodiments, the cement set activator may be present in an amount ranging between any of and/or including any of about 0.1%, about 1%, about 5%, about 10%, about 15%, or about 20% by weight of the pumice. One of ordinary skill in the art, with the benefit of this disclosure, will recognize the appropriate amount of cement set activator to include for a chosen application.

The exemplary set-delayed cement compositions disclosed herein may directly or indirectly affect one or more components or pieces of equipment associated with the preparation, delivery, recapture, recycling, reuse, and/or disposal of the disclosed set-delayed cement compositions. For example, the disclosed set-delayed cement compositions may directly or indirectly affect one or more mixers, related mixing equipment, mud pits, storage facilities or units, composition separators, heat exchangers, sensors, gauges, pumps, compressors, and the like used generate, store, monitor, regulate, and/or recondition the exemplary set-delayed cement compositions. The disclosed set-delayed cement compositions may also directly or indirectly affect any transport or delivery equipment used to convey the set-delayed cement compositions to a well site or downhole such as, for example, any transport vessels, conduits, pipelines, trucks, tubulars, and/or pipes used to compositionally move the set-delayed cement compositions from one location to another, any pumps, compressors, or motors (e.g., topside or downhole) used to drive the set-delayed cement compositions into motion, any valves or related joints used to regulate the pressure or flow rate of the set-delayed cement compositions, and any sensors (i.e., pressure and temperature), gauges, and/or combinations thereof, and the like. The disclosed set-delayed cement compositions may also directly or indirectly affect the various downhole equipment and tools that may come into contact with the set-delayed cement compositions such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

An embodiment provides a method of cementing in a subterranean formation. The method may comprise preparing a set-delayed cement composition. The method further may comprise storing the set-delayed cement composition. The method further may comprise transporting the set-delayed cement composition to a well site in a containment vessel. The method further may comprise discharging the set-delayed cement composition from the containment vessel and into a wellbore. The method may be utilized with the equipment, compositions, and/or methods steps disclosed herein. For example, the containment vessel 108 (e.g., FIG. 2) or containment vessel 108' (e.g., FIGS. 3 and 4) may be utilized with this method.

An embodiment provides a method for maximizing shear rate in a mixing vessel comprising: maximizing a velocity uniformity index for the mixing vessel, the velocity uniformity index being defined by equation [2] above. The method further may comprise maximizing a uniformity index of second invariant for the mixing vessel, the uniformity index being defined by equation [6] above. The method may be utilized with the equipment, compositions, and/or methods steps disclosed herein. For example, the containment vessel 108 (e.g., FIG. 2) or containment vessel 108' (e.g., FIGS. 3 and 4) may be utilized as the mixing vessel used in this method.

An embodiment provides a cementing system comprising: a discharge vessel for holding and/or mixing a set-delayed cement composition, wherein the discharge vessel comprises: a mixing chamber for holding the set-delayed cement composition, the mixing chamber being defined by a shell; and a shaft holding one or more mixing blades in the mixing chamber. The system may further comprise an accelerant vessel coupled to the discharge vessel for holding and/or mixing a cement set accelerator. The system may further comprise a downhole pump coupled to the discharge vessel for delivering the set-delayed cement composition from the discharge vessel into a wellbore. For example, the containment vessel 108 (e.g., FIG. 2) or containment vessel 108' FIGS. 3 and 4) may be utilized as the discharge vessel used in this method.

It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present embodiments are well adapted to attain the ends and advantages mentioned as well as those that are inherent therein. The particular embodiments disclosed above are illustrative only, as the present embodiments may be modified and practiced in different but equivalent manners apparent to those skilled in the art having the benefit of the teachings herein. Although individual embodiments are discussed, all combinations of each embodiment are contemplated and covered by the disclosure. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present disclosure. If there is any conflict in the usages of a word or term in this specification and one or more patent(s) or other documents that may be incorporated herein by reference, the definitions that are consistent with this specification should be adopted.

What is claimed is:

1. A method of cementing in a subterranean formation comprising:
    preparing a set-delayed cement composition in a containment vessel, wherein the containment vessel is portable and comprises: a mixing chamber for holding the set-delayed cement composition, the mixing chamber being defined by a shell; and a shaft holding one or more mixing blades in the mixing chamber;
    storing the set-delayed cement composition in the containment vessel;
    transporting the set-delayed cement composition to a well site in the containment vessel; and
    discharging the set-delayed cement composition from the containment vessel and into a wellbore.

2. A method according to claim 1 wherein the step of storing the set-delayed cement comprises storing the set-delayed cement composition for a period of about 1 day or longer prior to the step of transporting the set-delayed cement composition to the well site.

3. A method according to claim 2 further comprising intermittently mixing the set-delayed cement composition while the set-delayed cement composition is being stored.

4. A method according to claim 1 wherein the containment vessel further comprises baffles disposed on an interior surface of the shell, and wherein the mixing blades comprise upward facing mixing blades and downward facing mixing blades arranged vertically on the shaft.

5. A method according to claim 1 further comprising adding a cement set accelerator to the set-delayed cement composition.

6. A method according to claim 5 wherein the cement set accelerator comprises calcium chloride.

7. A method according to claim 1 wherein the set-delayed cement composition comprises pumice, lime, a set retarder, and a dispersant.

8. A method according to claim 1 wherein the well site is offshore.

9. A method according to claim 1 wherein the set-delayed cement composition is used to form a plug in the wellbore in a plug-and-abandon operation.

10. The method of claim 1, further comprising:
    maximizing a velocity uniformity index for the containment vessel, the velocity uniformity index being defined by the following equation:

$$VUI = 1/\{\Sigma_{m=1}^{p} ||\overline{v_m}| - |\overline{\overline{v_m}}||\}$$

wherein:

$$|\overline{\overline{v_m}}| = \Sigma_{m=1}^{p} \frac{|\overline{v_m}|}{p}$$

$$|\overline{v_m}| = [|v_{x,m}| + |v_{y,m}| + |v_{z,m}|]/3$$

$v_{x,m}$, $v_{y,m}$, and $v_{z,m}$ are the velocity vectors in volume element m, wherein m is from 1 to p, p being the number of volume elements in the containment vessel;
    maximizing a uniformity index of second invariant for the containment vessel, the uniformity index being defined by the following equation:

UISI=1/{Standard Deviation of $(-II)_m$} wherein: $-II$ is the Second Invariant of the strain rate tensor for Cartesian coordinates and is defined by the following equation:

$$-II = 2\left\{\left(\frac{\partial v_x}{\partial x}\right)^2 + \left(\frac{\partial v_y}{\partial y}\right)^2 + \left(\frac{\partial v_z}{\partial z}\right)^2\right\} + \left(\frac{\partial v_y}{\partial x} + \frac{\partial v_x}{\partial y}\right)^2 + \left(\frac{\partial v_z}{\partial y} + \frac{\partial v_y}{\partial z}\right)^2 + \left(\frac{\partial v_x}{\partial z} + \frac{\partial v_z}{\partial x}\right)^2$$

11. A method according to claim 10 wherein fluid flow in the containment vessel is defined by the Herschel Bulkley viscometric model.

12. A method according to claim 10 wherein the containment mixing vessel is designed to maximize the velocity uniformity index and the uniformity index of second invariant.

13. A cementing system comprising:
    a discharge vessel for holding and/or mixing a set-delayed cement composition, wherein the discharge vessel comprises: a mixing chamber for holding the set-delayed cement composition, the mixing chamber being defined by a shell; and a shaft holding one or more mixing blades in the mixing chamber;
    an accelerant vessel coupled to the discharge vessel for holding and/or mixing a cement set accelerator; and
    a downhole pump coupled to the discharge vessel for delivering the set-delayed cement composition from the discharge vessel into a wellbore.

14. A cementing system according to claim 13 further comprising a pump for receiving the set-delayed cement composition from the discharge vessel and the cement set accelerator and delivering a mixture of the set-delayed cement composition and the cement set accelerator to the downhole pump, the pump being coupled to the discharge vessel and the accelerator vessel by a manifold.

15. A cement system according to claim 13 further comprising a liquid additive pump configured to deliver the cement accelerator from the accelerant vessel to the discharge vessel.

16. A cementing system according to claim 13 wherein the discharge vessel further comprises baffles disposed on an interior surface of the shell, and wherein the mixing blades comprises upward facing mixing blades and downward facing mixing blades arranged vertically on the shaft.

17. A cementing system according to claim 13 wherein the discharge vessel is portable and comprises a frame that supports the shell, wherein the shell comprises forklift holes.

18. A cementing system according to claim 13 wherein the shell has a volume of from about 400 gallons to about 2,000 gallons.

* * * * *